US010406605B2

(12) United States Patent
Hecht et al.

(10) Patent No.: US 10,406,605 B2
(45) Date of Patent: Sep. 10, 2019

(54) CUTTING TOOL HAVING AN INDEXABLE CUTTING INSERT RETAINED BY A MOMENT FORCE ABOUT A PIVOT AXIS

(71) Applicant: Iscar, Ltd., Tefen (IL)

(72) Inventors: Gil Hecht, Nahariya (IL); Shay Avrahami, Nahariya (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 15/667,732

(22) Filed: Aug. 3, 2017

(65) Prior Publication Data
US 2018/0071832 A1     Mar. 15, 2018

Related U.S. Application Data

(60) Provisional application No. 62/393,718, filed on Sep. 13, 2016.

(51) Int. Cl.
    *B23B 27/16*      (2006.01)
    *B23B 29/04*      (2006.01)
    *B23B 29/08*      (2006.01)

(52) U.S. Cl.
CPC ............ *B23B 29/043* (2013.01); *B23B 27/16* (2013.01); *B23B 27/164* (2013.01); *B23B 29/08* (2013.01);
(Continued)

(58) Field of Classification Search
CPC ... B23B 27/1611; B23B 27/16; B23B 27/164; B23B 27/04; B23B 27/065;
(Continued)

(56) References Cited

U.S. PATENT DOCUMENTS 2,063,128 A * 12/1936 Severson ................ B23B 27/16
                                                                                                      407/96
4,169,690 A     10/1979 Kendra
(Continued)

FOREIGN PATENT DOCUMENTS

DE           2130814        12/1972
DE           3319799 A1 * 12/1984 ............. B23B 27/04
(Continued)

OTHER PUBLICATIONS

International Search Report dated Nov. 9, 2017, issued in PCT counterpart application (No. PCT/IL2017/050865).
(Continued)

*Primary Examiner* — Ryan C Rufo
(74) *Attorney, Agent, or Firm* — Womble Bond Dickinson (US) LLP

(57) ABSTRACT

A cutting tool has a holder and an indexable cutting insert secured therein. The holder has a head and a shank extending therefrom along a holder axis, the head having spaced apart lower and upper clamping portions located on opposite sides of a first plane containing the holder axis. The lower clamping portion has spaced apart first and second lower clamping surfaces located on opposite sides of a second plane perpendicular to the first plane, and the upper clamping portion has an upper clamping surface intersected by the second plane. The cutting insert has a peripheral surface with a plurality of circumferentially spaced cutting portions, and the second plane intersects the plurality of cutting portions. The upper clamping surface makes contact with a first abutment portion of the peripheral surface, and a second abutment portion of the peripheral surface makes contact with the first and second lower clamping surfaces.

34 Claims, 9 Drawing Sheets

(52) U.S. Cl.
CPC ..... *B23B 27/1611* (2013.01); *B23B 2200/048* (2013.01); *B23B 2200/3627* (2013.01); *B23B 2205/12* (2013.01)

(58) Field of Classification Search
CPC .......... B23B 2200/048; B23B 2205/02; B23B 2205/12; Y10T 407/2292
See application file for complete search history.

(56) References Cited

U.S. PATENT DOCUMENTS

| | | | |
|---|---|---|---|
| 4,230,427 | A | 10/1980 | Belttari et al. |
| 7,597,508 | B2 | 10/2009 | Hecht |
| 8,529,165 | B2 | 9/2013 | Chistyakov |
| 8,678,718 | B2 | 3/2014 | Hecht |
| 9,174,279 | B2 | 11/2015 | Hecht |
| 2001/0022123 | A1* | 9/2001 | Schiffers ................. B23B 27/08 82/158 |
| 2007/0231089 | A1 | 10/2007 | Hecht |
| 2011/0293382 | A1 | 12/2011 | Chistyakov |
| 2012/0099935 | A1* | 4/2012 | Hecht ................. B23B 27/1614 407/100 |
| 2013/0170918 | A1* | 7/2013 | Hecht ................... B23B 27/045 407/110 |
| 2014/0072379 | A1* | 3/2014 | Hecht ..................... B23B 29/24 407/70 |
| 2015/0183029 | A1 | 7/2015 | Makhlin et al. |
| 2017/0136549 | A1* | 5/2017 | Athad ................... B23B 27/145 |

FOREIGN PATENT DOCUMENTS

| | | | | |
|---|---|---|---|---|
| DE | 19955581 | A1 * | 5/2000 | ............. B23B 27/04 |
| DE | 10012821 | | 9/2001 | |
| DE | 102005019945 | A1 * | 11/2006 | ............. B23B 27/04 |
| DE | 102012017424 | A1 * | 3/2014 | ......... B23B 27/1666 |
| EP | 0767023 | A1 * | 4/1997 | ........... B23B 27/007 |
| GB | 488400 | A * | 7/1938 | ............ B23B 27/16 |
| GB | 620736 | A * | 3/1949 | ........... B23B 27/164 |
| JP | 2004209615 | A * | 7/2004 | ........... B23B 27/045 |
| SU | 1106591 | A2 * | 8/1984 | ............. B23B 27/16 |

OTHER PUBLICATIONS

Written Opinion dated Nov. 9, 2017, issued in PCT counterpart application (No. PCT/IL2017/050865).

* cited by examiner

CUTTING TOOL HAVING AN INDEXABLE CUTTING INSERT RETAINED BY A MOMENT FORCE ABOUT A PIVOT AXIS

RELATED APPLICATIONS

The present application claims priority to U.S. Provisional application No. 62/393,718 of Sep. 13, 2016. The contents of the aforementioned application are incorporated by reference in their entirety.

FIELD OF THE INVENTION

The present invention relates to a cutting tool having an indexable cutting insert for use in metal cutting processes in general, and for turning and profiling operations in particular.

BACKGROUND OF THE INVENTION

Within the field of cutting tools used in turning and profiling operations, there are many examples of cutting tools having indexable cutting inserts, some cutting inserts having a plurality of cutting portions circumferentially spaced about a peripheral surface thereof.

U.S. Pat. No. 4,169,690 discloses a cutting tool having an insert holder and an indexable cutting insert removably secured therein by means of a lever and a clamping screw. The cutting insert has spaced apart side surfaces with a peripheral surface extending therebetween, and a plurality of cutting regions circumferentially spaced about the peripheral surface, each cutting region having a forward surface and a rearward surface. The holder has supporting regions for engaging the rearward surface of the operative cutting region and the forward and rearward surfaces of a circumferentially adjacent non-operative cutting region. One end of the lever engages a notch on the peripheral surface, the other end of the lever engages a recess in the insert holder, and the clamping screw extends through an intermediate portion of the lever and threadingly engages the insert holder.

U.S. Pat. No. 7,597,508 discloses a cutting tool having an insert holder and an indexable cutting insert removably secured therein by means of a fastener. The insert holder has a forward securing portion and a rear body portion, the forward securing portion having a base and a securing surface, and a hole opening out to the base. The securing surface includes a first support, a second support and a third support which all extend transversely to the base. The cutting insert has opposing end surfaces, a peripheral side surface extending between the end surfaces, and a bore extending along an insert axis between the end surfaces. The peripheral surface comprises a first wall, a second wall, a third wall and at least one operative cutting portion. At least a portion of the first support abuts at least a portion of the first wall along a first abutment region, at least a portion of the second support abuts at least a portion of the second wall along a second abutment region, and at least a portion of the third support abuts at least a portion of the third wall along a third abutment region. The first and the second abutment regions diverge downwardly, the second and the third abutment regions diverge rearwardly, and the fastener is located in the bore and the hole.

It is an object of the present invention to provide an improved cutting tool having a stable and reliable means for removably securing 'wide-type' indexable cutting inserts in an insert holder.

SUMMARY OF THE INVENTION

In accordance with the present invention, there is provided a cutting tool comprising: an insert holder and an indexable cutting insert removably secured therein,
the insert holder comprising:
a holder head and a holder shank extending rearwardly therefrom along a holder axis,
the holder head having spaced apart lower and upper clamping portions located on opposite sides of a first plane containing the holder axis,
the lower clamping portion extending along a pivot axis and having spaced apart first and second lower clamping surfaces located on opposite sides of a second plane perpendicular to the first plane, and
the upper clamping portion displaceable relative to the lower clamping portion and having an upper clamping surface which is intersected by the second plane,
the cutting insert comprising:
opposing first and second end surfaces with a peripheral surface extending therebetween and an insert axis extending therethrough,
the peripheral surface having a plurality of cutting portions circumferentially spaced apart about the insert axis, the plurality of cutting portions including an operative first cutting portion having an operative first cutting edge formed at the intersection of a first rake surface and a first relief surface, the first rake surface facing in a first direction about the insert axis,
wherein:
the upper clamping surface makes contact with a first abutment portion of the peripheral surface,
a second abutment portion of the peripheral surface makes contact with the first and second lower clamping surfaces, and
the second plane intersects the plurality of cutting portions.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
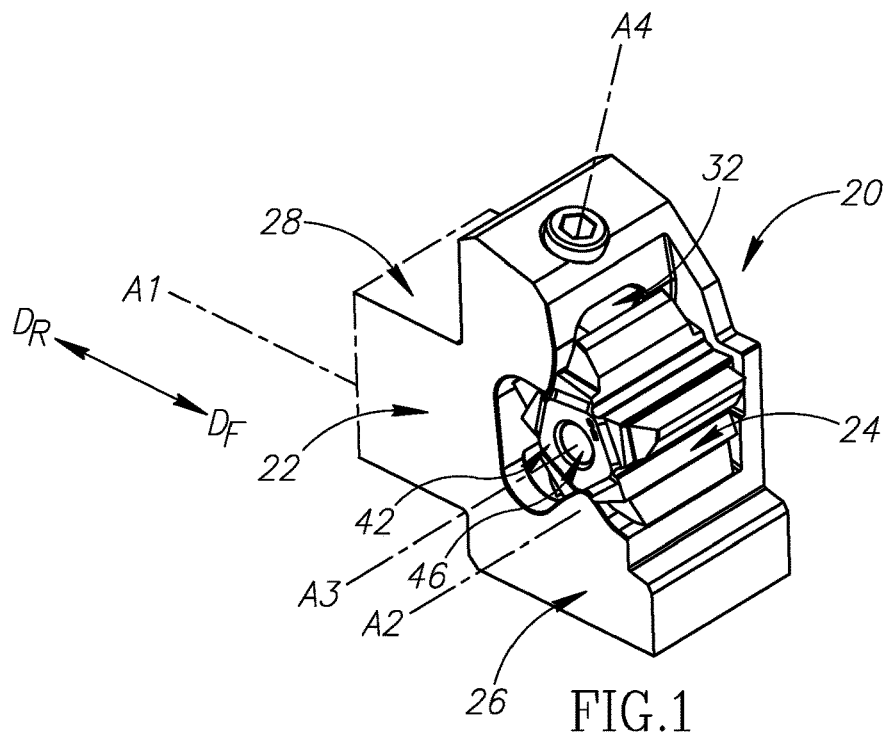
FIG. 1 is a perspective view of a cutting tool in accordance with some embodiments of the present invention.
Figure 2:
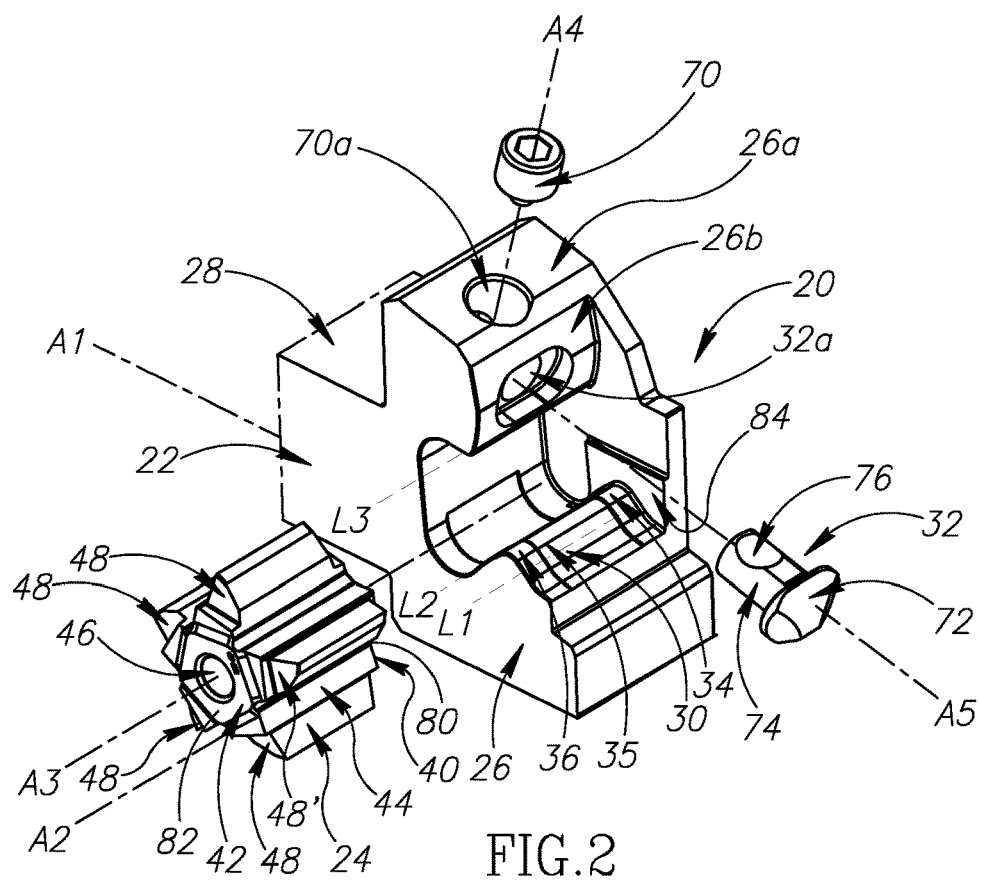
FIG. 2 is an exploded perspective view of the cutting tool shown in FIG. 1.
Figure 3:
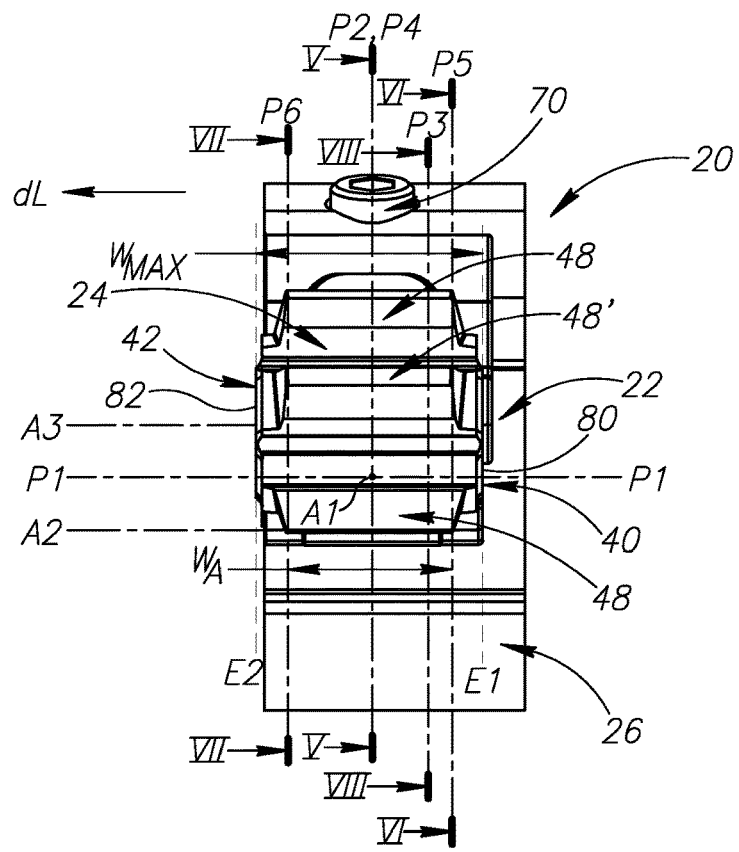
FIG. 3 is a front end view of the cutting tool shown in FIG. 1.

The present invention relates to a cutting tool 20, as shown in FIGS. 1 to 3, having an insert holder 22 and an indexable cutting insert 24 removably secured therein.

In some embodiments of the present invention, the insert holder 22 may preferably be manufactured form tool steel.

Also in some embodiments of the present invention, the cutting insert 24 may preferably be manufactured by form pressing and sintering cemented carbide, such as tungsten carbide, and may be coated or uncoated.

As shown in FIGS. 1 and 2, the insert holder 22 has a holder head 26 and a holder shank 28 extending rearwardly therefrom along a holder axis A1 which establishes a forward-to-rearward direction $D_F$, $D_R$.

A fastening member hole 70a is formed in an upper surface 26a of the holder head 26. A clamping portion hole 32a is formed in a forward facing surface 26b of the holder head 26. The fastening member hole 70a intersects the clamping portion hole 32a.

In some embodiments of the present invention, the holder head 26 and the holder shank 28 may have a rigid unitary one-piece construction.

Figure 4:
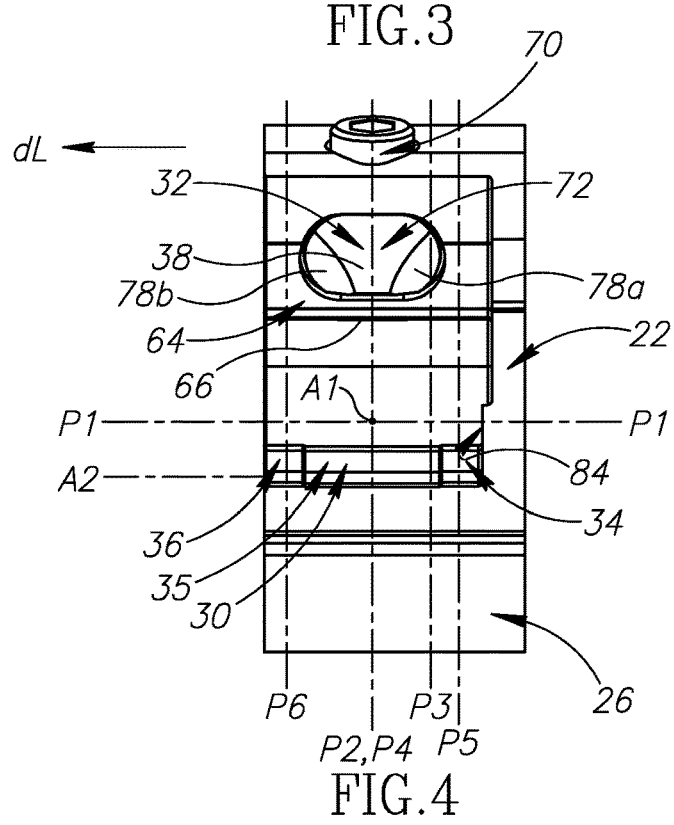
FIG. 4 is a front end view of the cutting tool shown in FIG. 1 with its cutting insert removed.

As shown in FIG. 4, the holder head 26 has spaced apart lower and upper clamping portions 30, 32 located on opposite sides of a horizontal first plane P1 containing the holder axis A1.

According to the present invention, as shown in FIG. 4, the lower clamping portion 30 extends along a pivot axis A2 and has spaced apart first and second lower clamping surfaces 34, 36 located on opposite sides of a vertical second plane P2 perpendicular to the first plane P1.

In some embodiments of the present invention, as shown in FIG. 4, the first and second lower clamping surfaces 34, 36 may be spaced apart by a transitional surface 35 of the lower clamping portion 30. The transitional surface 35 may be recessed relative to the first and second lower clamping surfaces 34, 36.

According to the present invention, the upper clamping portion 32 is displaceable relative to the lower clamping portion 30 and has an upper clamping surface 38 which is intersected by the second plane P2.

In some embodiments of the present invention, as shown in FIG. 4, the first and second lower clamping surfaces 34, 36 may be entirely located on opposite sides of a vertical third plane P3 parallel to the second plane P2, and the third plane P3 may not intersect the upper clamping surface 38.

Also in some embodiments of the present invention, the first and second lower clamping surfaces 34, 36 may exhibit mirror symmetry about the second plane P2.

Further in some embodiments of the present invention, the upper clamping portion 32 may be slidably retained in the holder head 26.

Yet further in some embodiments of the present invention, in a lateral direction dL perpendicular to the second plane P2, the upper clamping surface 38 may be entirely located between the first and second lower clamping surfaces 34, 36.

Yet still further in some embodiments of the present invention, as shown in FIG. 4, the second plane P2 may contain the holder axis A1.

As shown in FIGS. 1 to 3, the cutting insert 24 has opposing first and second end surfaces 40, 42 with a peripheral surface 44 extending therebetween and an insert axis A3 extending therethrough.

In some embodiments of the present invention, the pivot axis A2 and the insert axis A3 may be parallel.

Also in some embodiments of the present invention, a bore 46 coaxial with the insert axis A3 may intersect the first and second end surfaces 40, 42.

For embodiments of the present invention in which the cutting insert 24 includes the bore 46, the cutting insert 24 can be manufactured more efficiently, using less cemented carbide, and enabling easier handling during production.

According to the present invention, as shown in FIGS. 1 to 3, the peripheral surface 44 has a plurality of cutting portions 48 circumferentially spaced apart about the insert axis A3, and the second plane P2 intersects the plurality of cutting portions 48.

In some embodiments of the present invention, the plurality of cutting portions 48 may include an operative first cutting portion 48' having an operative first cutting edge 50' formed at the intersection of a first rake surface 52' and a first relief surface 54'.

Figure 5:
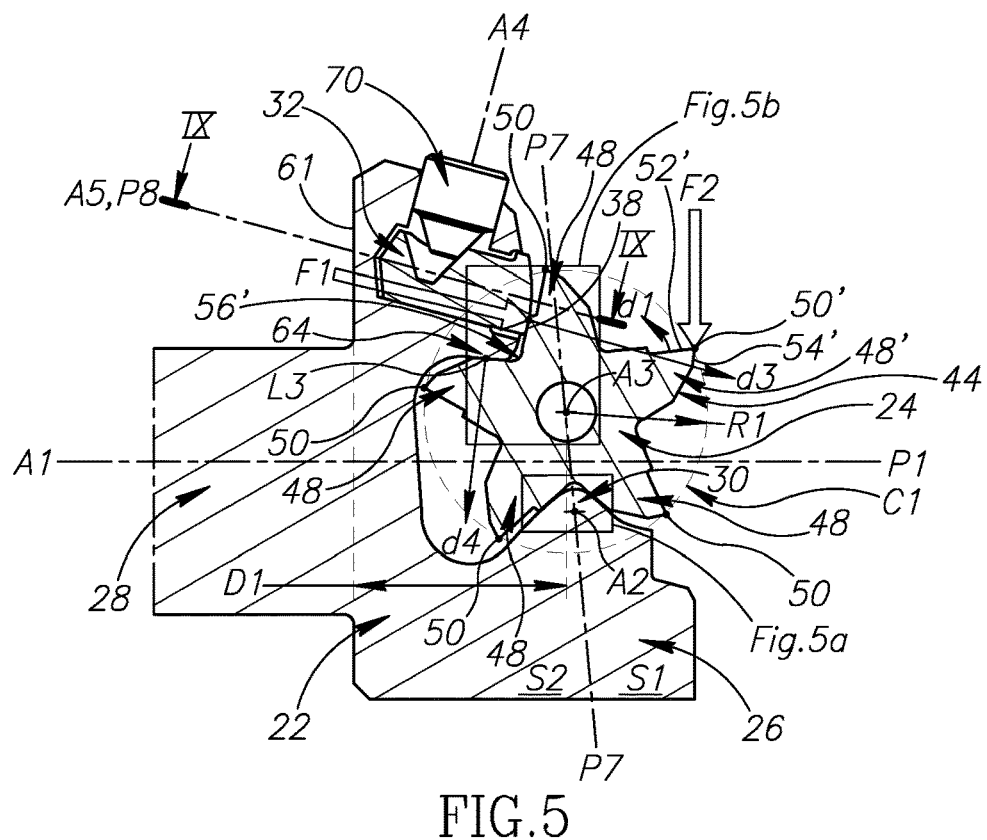
FIG. 5 is a cross-sectional view of the cutting tool shown in FIG. 3, taken along the line V-V.

As shown in FIG. 5, the first rake surface 52' may face in a first direction d1 about the insert axis A3.

In some embodiments of the present invention, the operative first cutting portion 48' may be located on the same side of the first plane P1 as the upper clamping portion 32.

Also in some embodiments of the present invention, each cutting portion 48 may have a cutting edge 50, and in a cross-section taken in a fourth plane P4 coincident with or parallel to the second plane P2, the plurality of cutting edges 50 may define a first imaginary circle C1 which circumscribes the peripheral surface 44.

FIG. 5 shows the first imaginary circle C1 in the cross-section taken in the fourth plane P4 coincident with the second plane P2.

It should be appreciated that the plurality of cutting edges 50 may generally extend along the direction of the insert axis A3, with each cutting edge 50 having a contour corresponding to a particular profiling operation.

In some embodiments of the present invention, as shown in FIG. 3, the cutting insert 24 may have a maximum width $W_{MAX}$ in a direction parallel to the insert axis A3, and the maximum width $W_{MAX}$ may be greater than a first radius R1 of the first imaginary circle C1.

Also in some embodiments of the present invention, the plurality of cutting portions 48 may be identical to each other.

According to the present invention, as shown in FIG. 5, the upper clamping surface 38 makes contact with a first abutment portion 56' of the peripheral surface 44.

Figure 6:
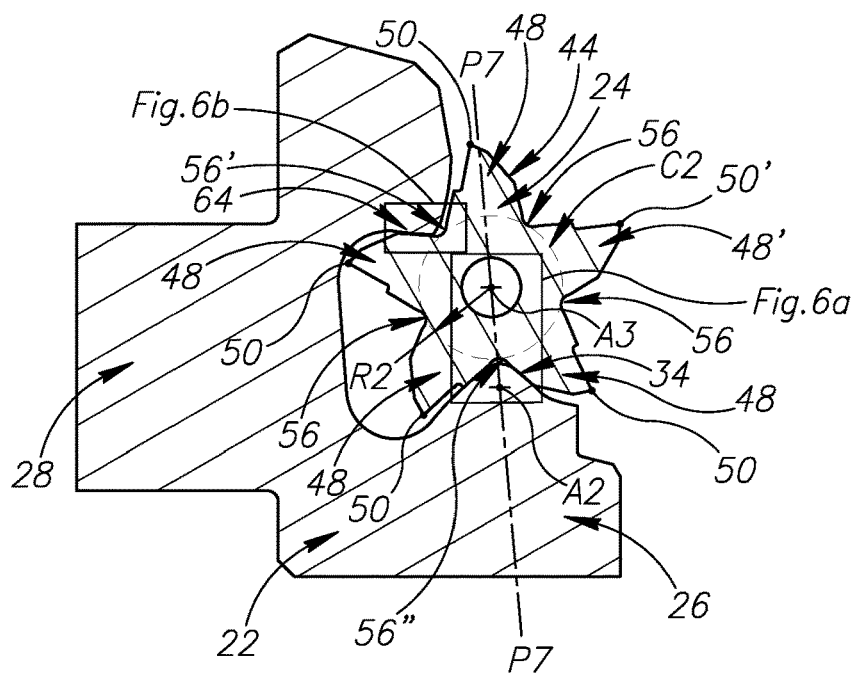
FIG. 6 is a cross-sectional view of the cutting tool shown in FIG. 3, taken along the line VI-VI.
Figure 7:
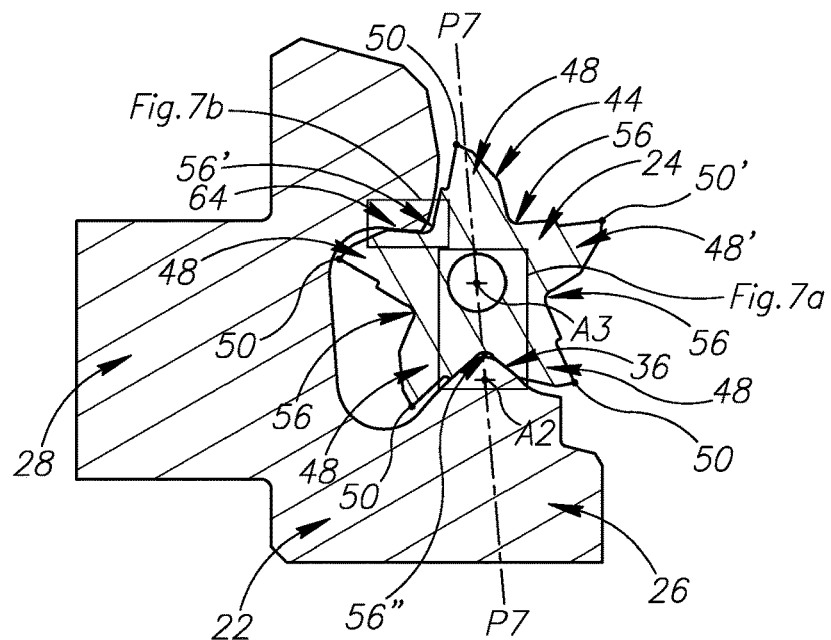
FIG. 7 is a cross-sectional view of the cutting tool shown in FIG. 3, taken along the line VII-VII.

Also according to the present invention, as shown in FIGS. 6 and 7, a second abutment portion 56" of the peripheral surface 44 makes contact with the first and second lower clamping surfaces 34, 36.

Figure 5A:
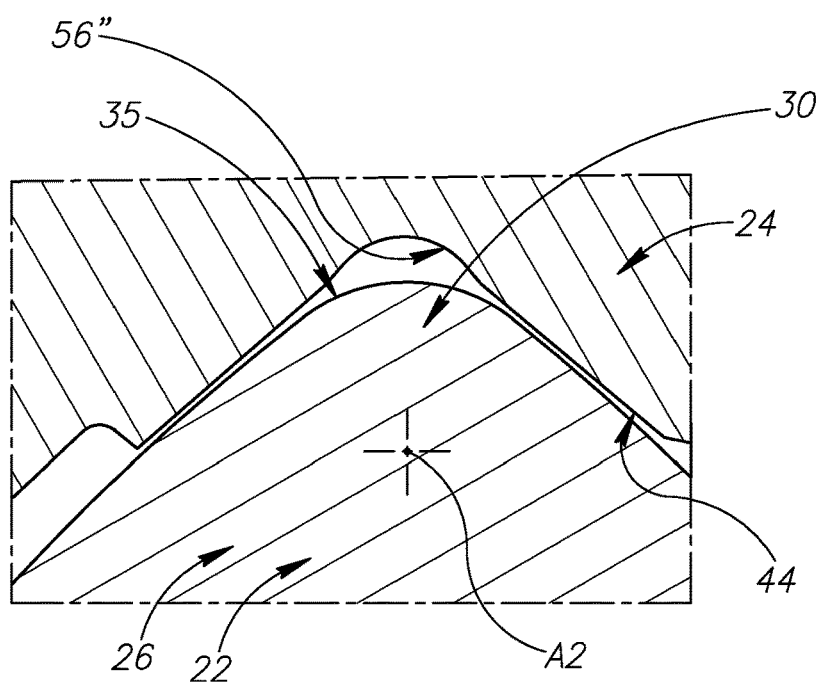
FIG. 5a is a detailed view of the cutting tool shown in FIG. 5.

In some embodiments of the present invention, in the cross-section taken in the second plane P2, as shown in FIG. 5a, there may be a gap and no contact between the second abutment portion 56" and the lower clamping portion 30.

Figure 8:
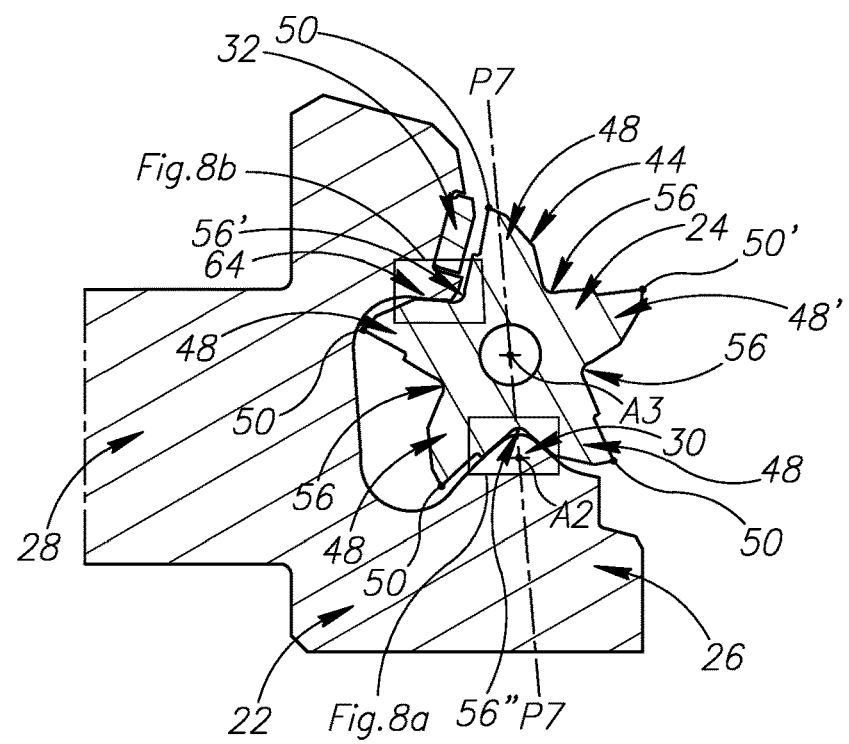
FIG. 8 is a cross-sectional view of the cutting tool shown in FIG. 3, taken along the line VIII-VIII.
Figure 8A:
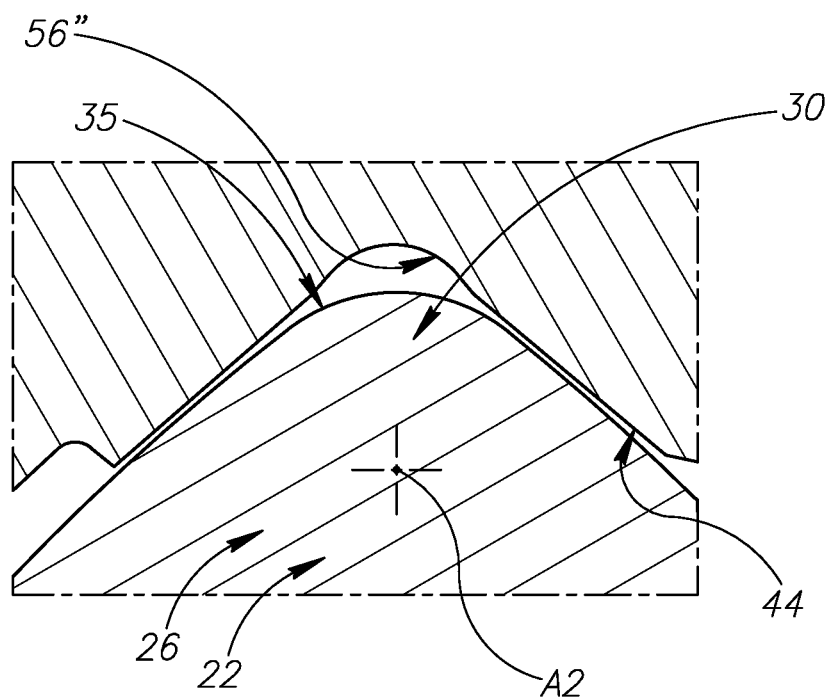
FIG. 8a is a first detailed view of the cutting tool shown in FIG. 8.
Figure 8B:
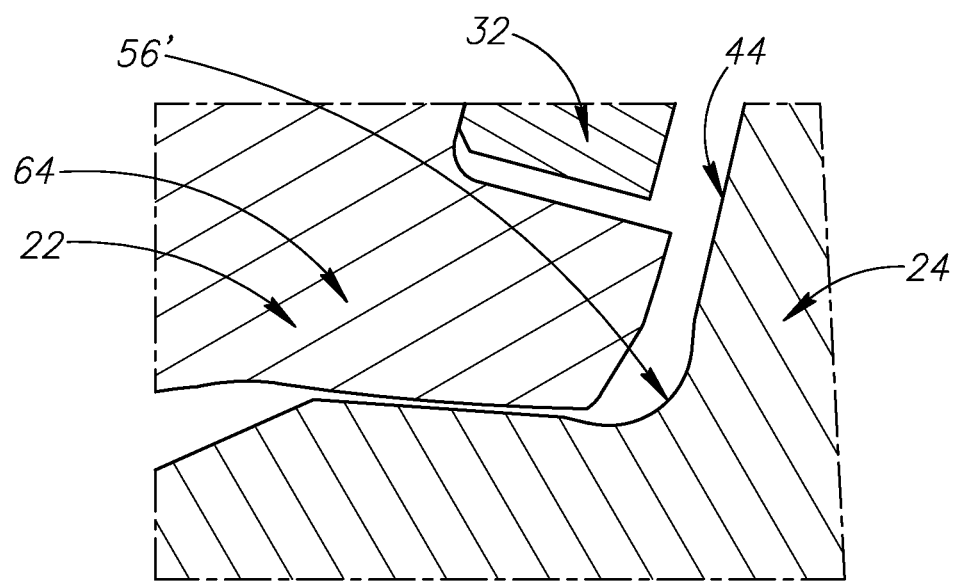
FIG. 8b is a second detailed view of the cutting tool shown in FIG. 8.

Also in some embodiments of the present invention, in a cross-section taken in the third plane P3, as shown in FIGS. 8, 8a and 8b, there may be a gap and no contact between the second abutment portion 56" and the lower clamping portion 30, and also a gap and no contact between the upper clamping portion 32 and the first abutment portion 56'.

It should be appreciated that by having spaced apart first and second lower clamping surfaces 34, 36, the lower clamping portion 30 provides a stable means for supporting 'wide-type' cutting inserts 24 having large values of maximum width $W_{MAX}$.

It should also be appreciated that by being located laterally between the spaced apart first and second lower clamping surfaces 34, 36, the single upper clamping surface 38 applies a clamping force F1 to the first abutment portion 56' which is evenly distributed between the first and second lower clamping surfaces 34, 36.

In some embodiments of the present invention, the peripheral surface 44 may have a plurality of abutment portions 56 circumferentially alternating with the plurality of cutting portions 48 about the insert axis A3, and the plurality of abutment portions 56 may include the first and second abutment portions 56', 56".

Also in some embodiments of the present invention, as shown in FIGS. 6 to 8, two circumferentially adjacent non-operative cutting portions 48 may be spaced apart by the second abutment portion 56".

Further in some embodiments of the present invention, as shown in FIGS. 6 to 8, the first and second abutment portions 56', 56" may be circumferentially spaced apart by at least two non-operative cutting portions 48.

Yet further in some embodiments of the present invention, the cutting insert 24 may exhibit rotational symmetry about the insert axis A3.

Yet still further in some embodiments of the present invention, the cutting insert 24 may exhibit N-fold rotational symmetry about the insert axis A3, and the peripheral surface 44 may have exactly N cutting portions 48.

For embodiments of the present invention in which N=5, as shown in FIGS. 6 to 8, two circumferentially adjacent non-operative cutting portions 48 may be spaced apart by the first abutment portion 56', and two other circumferentially adjacent non-operative cutting portions 48 may be spaced apart by the second abutment portion 56".

As shown in FIGS. 6 and 7, in cross-sections taken in fifth and sixth planes P5, P6 parallel to the second plane P2 and intersecting the first and second lower clamping surfaces 34, 36, respectively, the first and second lower clamping surfaces 34, 36 may be convex.

Figure 6A:
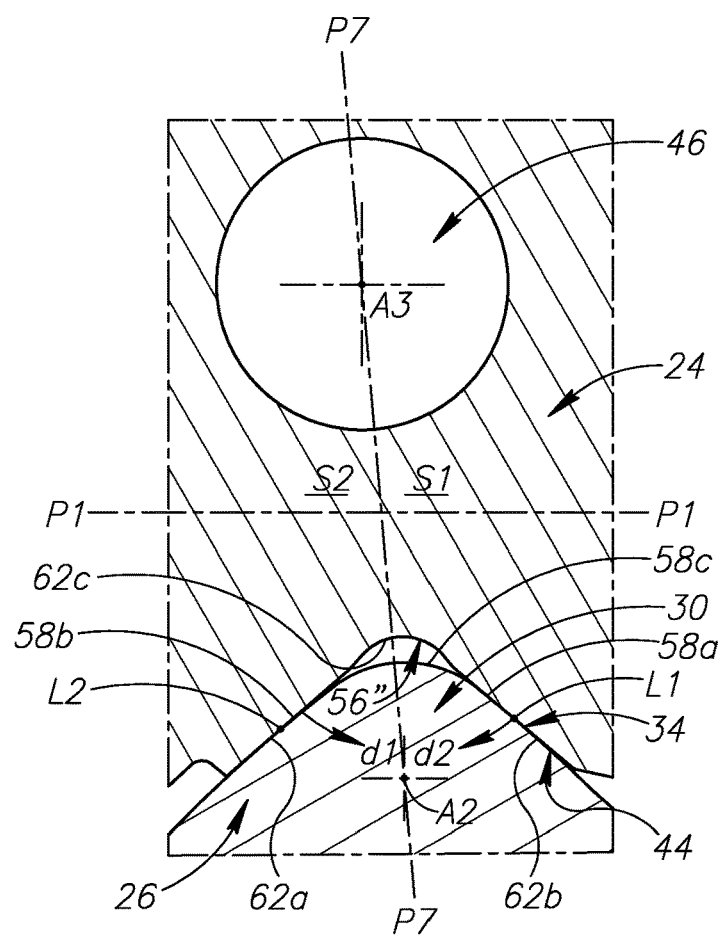
FIG. 6a is a detailed view of the cutting tool shown in FIG. 6.

As shown in FIG. 6a, the first lower clamping surface 34 may have front and rear first lower clamping zones 58a, 58b converging towards the first plane P1.

Figure 7A:
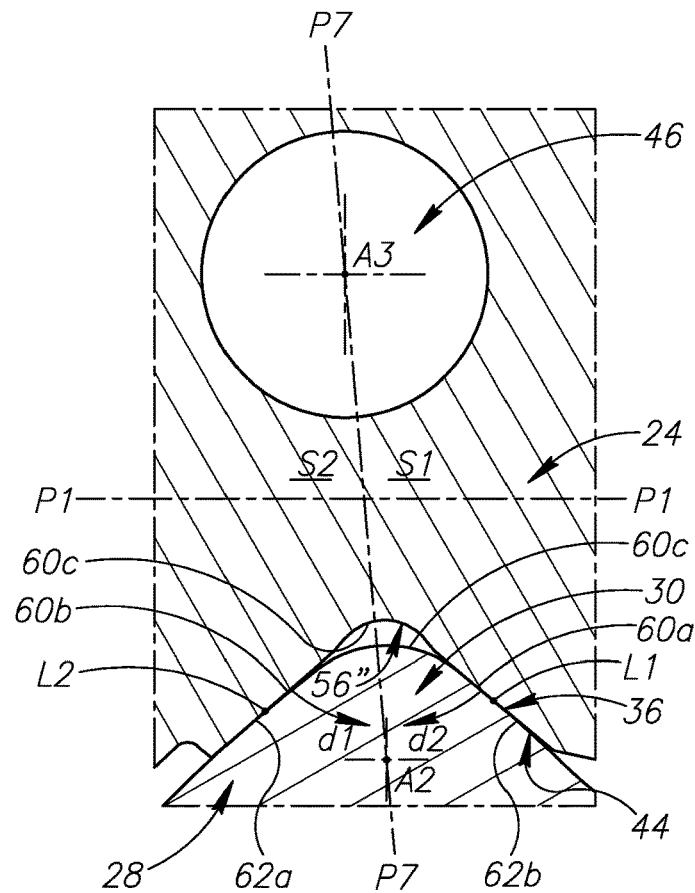
FIG. 7a is a detailed view of the cutting tool shown in FIG. 7.

As shown in FIG. 7a, the second lower clamping surface 36 may have front and rear second lower clamping zones 60a, 60b converging towards the first plane P1.

In some embodiments of the present invention, as in FIGS. 6a and 7a, the front and rear first lower clamping zones 58a, 58b and the front and rear second lower clamping zones 60a, 60b may make simultaneous contact with the second abutment portion 56".

Also in some embodiments of the present invention, shown in FIG. 6a, the front and rear first lower clamping zones 58a, 58b may be spaced apart by a curved first intermediate surface 58c.

Further in some embodiments of the present invention, as shown in FIG. 7a, and the front and rear second lower clamping zones 60a, 60b may be spaced apart by a curved second intermediate surface 60c.

Yet further in some embodiments of the present invention, the first and second intermediate surfaces 58c, 60c may not make contact with the second abutment portion 56".

Yet still further in some embodiments of the present invention, in the cross-sections taken in fifth or sixth planes P5, P6, the plurality of abutment portions 56 may define a second imaginary circle C2 which inscribes the peripheral surface 44.

FIG. 6 shows the second imaginary circle C2 in the cross-section taken the fifth plane P5.

In some embodiments of the present invention, as shown in FIG. 3, the cutting insert 24 may have an abutment width $W_A$ between the fifth and sixth planes P5, P6, and the abutment width $W_A$ may be greater than a second radius R2 of the second imaginary circle C2.

As shown in FIGS. 6a and 7a, the front first and front second lower clamping zones 58a, 60a may contain two segments of a first imaginary straight line L1, and the rear first and rear second lower clamping zones 58b, 60b may contain two segments of a second imaginary straight line L2.

In some embodiments of the present invention, the first and second imaginary straight lines L1, L2 may be parallel to the pivot axis A2.

Also in some embodiments of the present invention, the second imaginary straight line L2 may be located rearward of the first imaginary straight line L1.

As shown in FIGS. 5 to 8, the pivot and insert axes A2, A3 may be contained in a seventh plane P7.

In some embodiments of the present invention, as shown in FIG. 5, the operative first cutting portion 48' may be located on a first side S1 of the seventh plane P7, and the upper clamping portion 32 may be located on an opposite second side S2 of the seventh plane P7.

Also in some embodiments of the present invention, the holder shank 28 may be located on the second side S2 of the seventh plane P7.

Further in some embodiments of the present invention, the holder head 26 may include a rearwardly facing rear head surface 61 above the first plane P1.

Yet further in some embodiments of the present invention, the rear head surface 61 may be perpendicular to the holder axis A1.

As shown in FIG. 5, in a cross-section taken in the second plane P2, the insert axis A3 may be located a first distance D1 forward of the rear head surface 61 along the holder axis A1, and the first distance D1 may be less than twice the first radius R1 of the first imaginary circle C1, i.e., D1<2R1.

For embodiments of the present invention in which D1<2R1, the upper clamping portion 32 is advantageously compactly retained in the holder head 26.

In some embodiments of the present invention, as shown in FIGS. 6a and 7a, the front first and front second lower clamping zones 58a, 60a may be located on the first side S1 of the seventh plane P7, and the rear first and rear second lower clamping zones 58b, 60b may be located on the second side S2 of the seventh plane P7.

As shown in FIGS. 6a and 7a, in the cross-sections taken in the fifth and sixth planes P5, P6, the second abutment portion 56" may be concave.

In some embodiments of the present invention, the second abutment portion 56" may have second leading and trailing abutment surfaces 62a, 62b diverging away from the insert axis A3.

As shown in FIGS. 6a and 7a, the second trailing abutment surface 62b may make contact with the front first and front second lower clamping zones 58a, 60a, and the second leading abutment surface 62a may make contact with the rear first and rear second lower clamping zones 58b, 60b.

In some embodiments of the present invention, the second leading and trailing abutment surfaces 62a, 62b may be spaced apart by a curved second joining surface 62c, and the second joining surface 62c may not make contact with the lower clamping portion 30.

Also in some embodiments of the present invention, the second joining surface 62c may contain the radially innermost point of the second abutment portion 56".

As shown in FIGS. 6a and 7a, the second leading abutment surface 62a may face in the first direction d1 about the insert axis A3, and the second trailing abutment surface 62b may face in an opposite second direction d2 about the insert axis A3.

In some embodiments of the present invention, as shown in FIGS. 4 and 5, the holder head 26 may include a stopper portion 64 having a stopper surface 66, and the first abutment portion 56' may make contact with the stopper surface 66.

Also in some embodiments of the present invention, the stopper surface 66 may be intersected by the second plane P2.

Further in some embodiments of the present invention, in the lateral direction dL, the stopper surface 66 may be entirely located between the first and second lower clamping surfaces 34, 36.

Yet further in some embodiments of the present invention, the stopper surface 66 may exhibit mirror symmetry about the second plane P2.

Figure 6B:
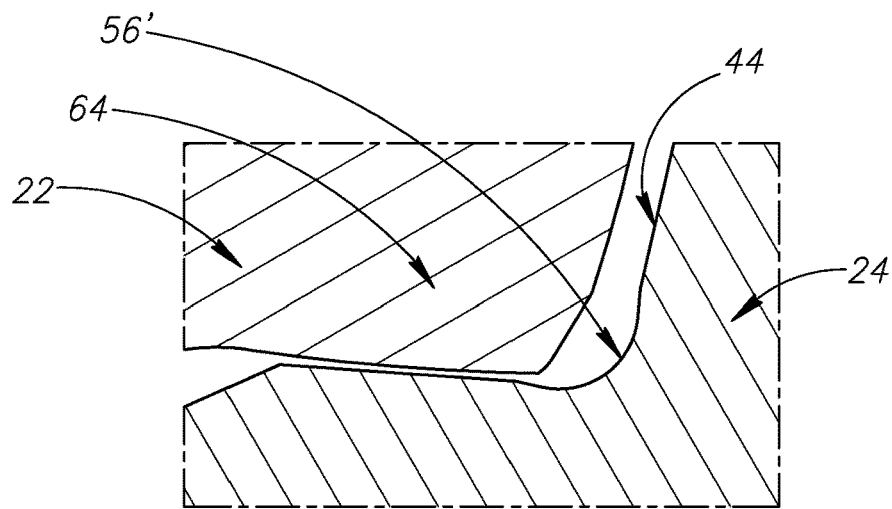
FIG. 6b is a detailed view of the cutting tool shown in FIG. 6.
Figure 7B:
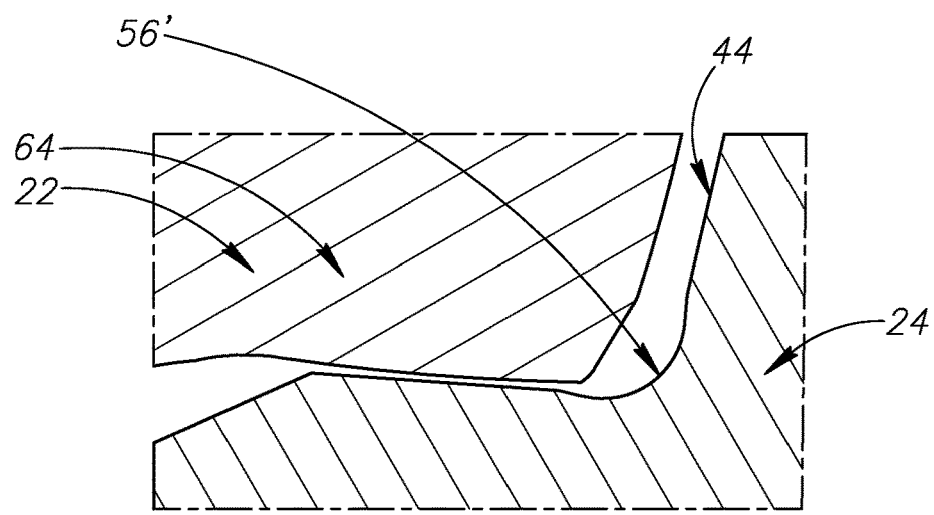
FIG. 7b is a detailed view of the cutting tool shown in FIG. 7.

Yet still further in some embodiments of the present invention, in cross-sections taken in the fifth, sixth and third planes P5, P6, P3, as shown in FIGS. 6b, 7b and 8b, respectively, there may be a gap and no contact between the first abutment portion 56' and the stopper portion 64.

For embodiments of the present invention in which the single stopper surface 66 is located laterally between the spaced apart first and second lower clamping surfaces 34, 36, the stopper surface 66 provides a reliable means for contact by the first abutment portion 56', which accounts for the tolerances associated with several different indexable cutting inserts 24 being removably secured in the same insert holder 22.

In some embodiments of the present invention, the lower clamping portion 30 and the stopper portion 64 may have a rigid unitary one-piece construction.

Also in some embodiments of the present invention, the stopper portion 64 may be located on the same side of the first plane P1 as the upper clamping portion 32.

Further in some embodiments of the present invention, the stopper surface 66 may contain a third imaginary straight line L3 parallel to the pivot axis A2.

As shown in FIG. 5, the upper clamping surface 38 may face in a first direction d3 about the pivot axis A2, and the stopper surface 66 may face in a second direction d4 about the pivot axis A2, the second direction d4 being rotationally opposite the first direction d3.

Figure 5B:
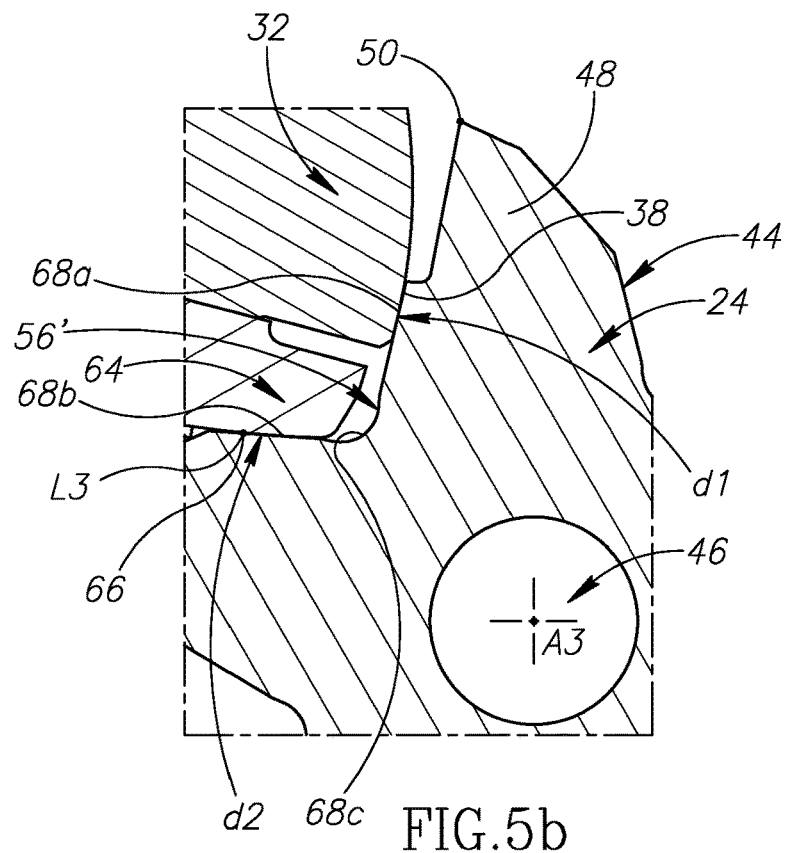
FIG. 5b is a detailed view of the cutting tool shown in FIG. 5.

As shown in FIGS. 5 and 5b, in the cross-section taken in the second plane P2, the upper clamping surface 38 may be convex.

In some embodiments of the present invention, the upper clamping surface 38 may exhibit mirror symmetry about the second plane P2.

As shown in FIGS. 5 and 5b, in the cross-section taken in the second plane P2, the first abutment portion 56' may be concave.

In some embodiments of the present invention, as shown in FIG. 5b, the first abutment portion 56' may have first leading and trailing abutment surfaces 68a, 68b diverging away from the insert axis A3.

As shown in FIG. 5b, the upper clamping surface 38 may make contact with the first leading abutment surface 68a, and the first trailing abutment surface 68b may make contact with the stopper surface 66.

For embodiments of the present invention in which the upper clamping surface 38 is convex, contact between the upper clamping surface 38 and the first leading abutment surface 68a may be reliably made in the form of linear contact.

In some embodiments of the present invention, the first leading and trailing abutment surfaces 68a, 68b may be spaced apart by a curved first joining surface 68c, and the first joining surface 68c may not make contact with the stopper portion 64 or the upper clamping portion 32.

Also in some embodiments of the present invention, the first joining surface 68c may contain the radially innermost point of the first abutment portion 56'.

As shown in FIG. 5b, the first leading abutment surface 68a may face in the first direction d1 about the insert axis A3, and the first trailing abutment surface 68b may face in the second direction d2 about the insert axis A3.

As shown in FIGS. 5 and 5b, the clamping force F1 applied to the first leading abutment surface 68a by the upper clamping surface 38 may be directed in the first direction d3 about the pivot axis A2.

It should be appreciated that in the cross-section taken in the second plane P2, as shown in FIG. 5, a cutting force F2 associated with profiling operations may also be directed in the first direction d3 about the pivot axis A2.

Directing the clamping and cutting forces F1, F2 in the first direction d3 about the pivot axis A2 ensures firm and stable contact between the second abutment portion 56" and the first and second lower clamping surfaces 34, 36, and also between the first abutment portion 56' and the stopper surface 66.

Thus, in some embodiments, the cutting insert 24 is retained in the insert holder 22 solely by directional forces applied about the pivot axis A2.

In some embodiments of the present invention, the cutting tool 20 may be devoid of a clamping screw extending through the bore 46.

Also in some embodiments of the present invention, the cutting tool 20 may be devoid of a clamping force being applied to the cutting insert 24 in a direction transverse to the second plane P2.

As shown in FIGS. 1 to 5, the upper clamping portion 32 may be displaceable relative to the lower clamping portion 30 by means of a threaded fastening member 70.

Figure 9:
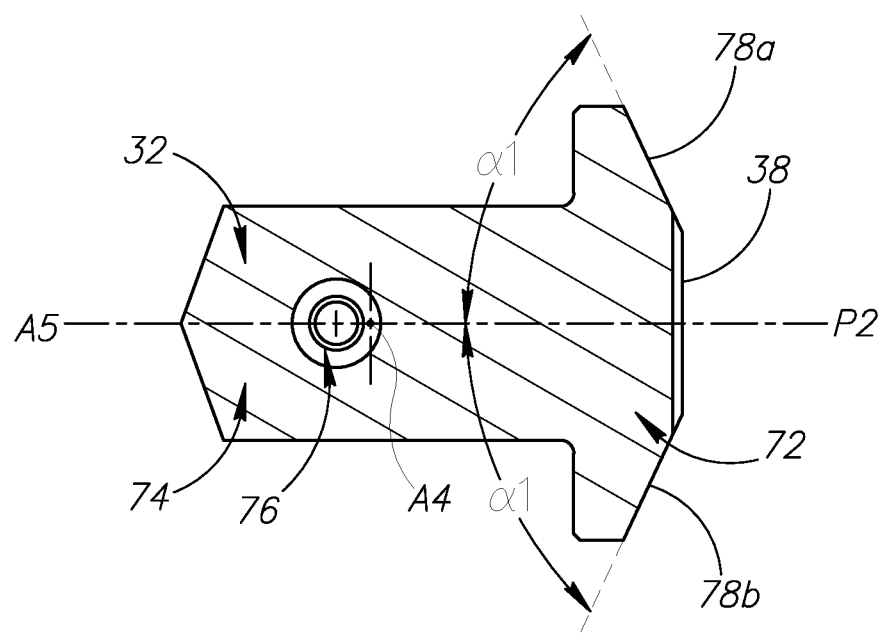
FIG. 9 is a cross-sectional view of an upper clamping portion shown in FIG. 5, taken along the line IX-IX.

As shown in FIGS. 2, 5 and 9, the upper clamping portion 32 is received into, and occupies, the clamping portion hole 32a. Meanwhile, the threaded fastening member 70 is received into, and occupies, the fastening member hole 70a, where it engages the upper clamping portion 32. Rotating the threaded fastening member 70 in a first direction causes the upper clamping surface 38 to apply the aforementioned clamping force F1 against the leading abutment surface 68a, thereby applying a moment force that causes the cutting insert 24 to pivot about the pivot axis A2 and the insert's trailing abutment surface 68b to abut and press against the stopper surface 66. Thus, in some embodiments, the cutting insert 24 may be retained by solely by moment forces applied about the pivot axis A2 and without the use of a clamping screw or other fastening member which either penetrates, or passes through a clamping through hole formed in the insert. As such, the present insert holder 22 is configured to retain a cutting insert having such a clamping through hole, without actually using the clamping through hole.

In some embodiments of the present invention, the fastening member 70 may be rotatable about a thread axis A4, and the thread axis A4 may be contained in the second plane P2.

As shown in FIGS. 5 and 9, the upper clamping portion 32 may include a clamping head 72 and a clamping shaft 74 extending therefrom along a shaft axis A5, the upper clamping surface 38 may be disposed on the clamping head 72, and the fastening member 70 may engage a shaft recess 76 in the clamping shaft 74.

In some embodiments of the present invention, the shaft axis A5 may be contained in the second plane P2.

Also in some embodiments of the present invention, the shaft recess 76 may be frusto-conical shaped.

Further in some embodiments of the present invention, the clamping head 72 may include two wing surfaces 78a, 78b spaced apart by the upper clamping surface 38.

As shown in FIG. 9, in a cross-section taken in an eighth plane P8 containing the shaft axis A5 and perpendicular to the second plane P2, each wing surface 78a, 78b may form an internal acute wing angle α1 with the shaft axis A5.

For embodiments of the present invention in which each wing surface 78a, 78b is inclined with respect to the shaft axis A5, the cutting insert 24 can be removed from the insert holder 22 and easily replaced without snagging against the clamping head 72.

In some embodiments of the present invention, as shown in FIGS. 1 to 3, the first and second end surfaces 40, 42 may have respective first and second raised support surfaces 80, 82, and the first and second raised support surfaces 80, 82 may define respective first and second end planes E1, E2.

Also in some embodiments of the present invention, neither of the first and second end planes E1, E2 may intersect the plurality of cutting portions 48.

Further in some embodiments of the present invention, as shown in FIGS. 1 to 4, the holder head 26 may include a side wall 84 parallel to the second plane P2, and one of the first and second raised support surfaces 80, 82 may make contact with the side wall 84.

Although the present invention has been described to a certain degree of particularity, it should be understood that various alterations and modifications could be made without departing from the spirit or scope of the invention as hereinafter claimed.

What is claimed is:

1. A cutting tool (20) comprising an insert holder (22) and an indexable cutting insert (24) removably secured therein, the insert holder (22) comprising:
    a holder head (26) and a holder shank (28) extending rearwardly therefrom along a holder axis (A1),
        the holder head (26) having spaced apart lower and upper clamping portions (30, 32) located on opposite sides of a first plane (P1) containing the holder axis (A1),
        the lower clamping portion (30) extending along a pivot axis (A2) and having first and second lower clamping surfaces (34, 36) located on opposite sides of a second plane (P2) perpendicular to the first plane (P1), the first and second lower clamping surfaces (34, 36) being separated by a recess;
        the upper clamping portion (32) displaceable relative to the lower clamping portion (30) and having an upper clamping surface (38) which is intersected by the second plane (P2), and
        in cross-sections taken in fifth and sixth planes (P5, P6) parallel to the second plane (P2) and intersecting the first and second lower clamping surfaces (34, 36), respectively, the first and second lower clamping surfaces (34, 36) are convex,
    the cutting insert (24) comprising:
        opposing first and second end surfaces (40, 42) with a peripheral surface (44) extending therebetween and an insert axis (A3) extending therethrough, the insert axis (A3) being spaced apart from the pivot axis (A2),
        the peripheral surface (44) having a plurality of cutting portions (48) circumferentially spaced apart about the insert axis (A3), one of the plurality of cutting portions (48) being an operative first cutting portion (48') having an operative first cutting edge (50') formed at the intersection of a first rake surface (52') and a first relief surface (54'), the first rake surface (52') facing in a first direction (d1) about the insert axis (A3),
    wherein:
        only a single indexable insert is retained between the lower and upper clamping portions (30, 32),
        the upper clamping surface (38) makes contact with a first abutment portion (56') of the peripheral surface (44),
        a second abutment portion (56") of the peripheral surface (44) makes contact with the first and second lower clamping surfaces (34, 36), and
    the second plane (P2) intersects the plurality of cutting portions (48).

2. The cutting tool (20) according to claim 1, wherein:
    the first and second lower clamping surfaces (34, 36) are entirely located on opposite sides of a third plane (P3) parallel to the second plane (P2), and
    the third plane (P3) does not intersect the upper clamping surface (38).

3. The cutting tool (20) according to claim 1, wherein:
    in a lateral direction (dL) perpendicular to the second plane (P2), the upper clamping surface (38) is entirely located between the first and second lower clamping surfaces (34, 36).

4. The cutting tool (20) according to claim 1, wherein:
    the first and second abutment portions (56', 56") are circumferentially spaced apart about the insert axis (A3) by at least two non-operative cutting portions (48).

5. The cutting tool (20) according to claim 1, wherein:
    two circumferentially adjacent non-operative cutting portions (48) are spaced apart by the second abutment portion (56").

6. The cutting tool (20) according to claim 1, wherein:
    the peripheral surface (44) has a plurality of abutment portions (56) circumferentially alternating with the plurality of cutting portions (48) about the insert axis (A3), and
    the plurality of abutment portions (56) include the first and second abutment portions (56', 56").

7. The cutting tool (20) according to claim 1, wherein:
the first lower clamping surface (34) has front and rear first lower clamping zones (58a, 58b) converging towards the first plane (P1),
the second lower clamping surface (36) has front and rear second lower clamping zones (60a, 60b) converging towards the first plane (P1), and
the front and rear first lower clamping zones (58a, 58b) and the front and rear second lower clamping zones (60a, 60b) all contact the second abutment portion (56").

8. The cutting tool (20) according to claim 7, wherein:
the front first lower clamping zone (58a) and front second lower clamping zone (60a) each contain a corresponding segment of a first imaginary straight line (L1),
the rear first lower clamping zone (58b) and rear second lower clamping zone (60b) each contain a corresponding segment of a second imaginary straight line (L2),
the first and second imaginary straight lines (L1, L2) are parallel to the pivot axis (A2).

9. The cutting tool (20) according to claim 7, wherein:
the second abutment portion (56") has second leading and trailing abutment surfaces (62a, 62b) diverging away from the insert axis (A3),
the second trailing abutment surface (62b) makes contact with the front first and front second lower clamping zones (58a, 60a), and
the second leading abutment surface (62a) makes contact with the rear first and rear second lower clamping zones (58b, 60b).

10. The cutting tool (20) according to claim 9, wherein:
the second leading and trailing abutment surfaces (62a, 62b) are spaced apart by a curved second joining surface (62c), and
the second joining surface (62c) does not make contact with the lower clamping portion (30).

11. The cutting tool (20) according to claim 10, wherein:
the second joining surface (62c) contains the radially innermost point of the second abutment portion (56").

12. The cutting tool (20) according to claim 1, wherein:
the holder head (26) includes a stopper portion (64) having a stopper surface (66), and
the first abutment portion (56') makes contact with the stopper surface (66).

13. The cutting tool (20) according to claim 12, wherein:
in a lateral direction (dL) perpendicular to the second plane (P2), the stopper surface (66) is entirely located between the first and second lower clamping surfaces (34, 36).

14. The cutting tool (20) according to claim 12, wherein:
the first abutment portion (56') has first leading and trailing abutment surfaces (68a, 68b) diverging away from the insert axis (A3),
the upper clamping surface (38) makes contact with the first leading abutment surface (68a), and
the first trailing abutment surface (68b) makes contact with the stopper surface (66).

15. The cutting tool (20) according to claim 14, wherein:
the first leading and trailing abutment surfaces (68a, 68b) are spaced apart by a curved first joining surface (68c), and
the first joining surface (68c) does not make contact with the stopper portion (64) or the upper clamping portion (32).

16. The cutting tool (20) according to claim 15, wherein:
the first joining surface (68c) contains the radially innermost point of the first abutment portion (56').

17. The cutting tool (20) according to claim 14, wherein:
the upper clamping surface (38) faces in a first direction (d3) about the pivot axis (A2), and
the stopper surface (66) faces in a second direction (d4) about the pivot axis (A2), the second direction (d4) about the pivot axis (A2) being rotational opposite the first direction (d3) about the pivot axis (A2).

18. The cutting tool (20) according to claim 17, wherein:
a clamping force (F1) applied to the first leading abutment surface (68a) by the upper clamping surface (38) is directed in the first direction (d3) about the pivot axis (A2).

19. The cutting tool (20) according to claim 1, wherein:
the upper clamping portion (32) is displaceable relative to the lower clamping portion (30) by means of a threaded fastening member (70).

20. The cutting tool (20) according to claim 19, wherein:
the upper clamping portion (32) comprises a clamping head (72) and a clamping shaft (74) extending therefrom along a shaft axis (A5),
the upper clamping surface (38) is disposed on the clamping head (72), and
the fastening member (70) engages a shaft recess (76) in the clamping shaft (74).

21. The cutting tool (20) according to claim 1, wherein:
the upper clamping portion (32) is slidably retained in the holder head (26).

22. The cutting tool (20) according to claim 1, wherein:
the cutting tool (20) is devoid of a clamping force being applied to the cutting insert (24) in a direction transverse to the second plane (P2).

23. The cutting tool (20) according to claim 1, wherein:
each cutting portion (48) has a cutting edge (50), and
in a cross-section taken in a fourth plane (P4) coincident with or parallel to the second plane (P2), the plurality of cutting edges (50) define a first imaginary circle (C1) which circumscribes the peripheral surface (44).

24. The cutting tool (20) according to claim 23, wherein:
the cutting insert (24) has a maximum width ($W_{MAX}$) in a direction parallel to the insert axis (A3), and
the maximum width ($W_{MAX}$) is greater than a first radius (R1) of the first imaginary circle (C1).

25. The cutting tool (20) according to claim 1, wherein:
the first and second lower clamping surfaces (34, 36) are spaced apart from one another along the pivot axis (A2) by a transitional surface (35) which is recessed relative to the first and second lower clamping surfaces (34, 36).

26. The cutting tool (20) according to claim 1, wherein:
the cutting insert (24) is indexable about the insert axis (A3);
the insert axis (A3) is parallel to the pivot axis (A2);
the first and second lower clamping surfaces (34, 36) are spaced apart from one another along the pivot axis (A2); and
the second plane (P2) and the first plane (P1) both contain the holder axis (A1).

27. An insert holder (22) having holder axis (A1) establishing a forward-to-rearward direction ($D_F$, $D_R$), and comprising:
a holder shank (22) extending along the holder axis (A1); and
a holder head (26) formed at a forward end of the holder shank (26), the holder head comprising:
spaced apart lower and upper clamping portions (30, 32) located on opposite sides of a horizontal first plane (P1) containing the holder axis (A1), the upper clamping portion (32) being displaceable relative to the lower clamping portion (30);

a pivot axis (A2) extending through the lower clamping portion (30) in a direction parallel to the horizontal first plane (P1);

first and second lower clamping surfaces (34, 36) formed on the lower clamping portion (30) and spaced apart from one another along the pivot axis (A2) by a transitional surface (35) which is recessed relative to the first and second lower clamping surfaces (34, 36);

a vertical second plane (P2) extending along the holder axis (H1), perpendicular to the horizontal first plane (P1) and located between the first and second lower clamping surfaces (34, 36);

an upper clamping surface (38) provided on the upper clamping portion (32) and facing a first direction, the upper clamping surface (38) intersected by the vertical second plane (P2) and entirely located between the first and second lower clamping surfaces (34, 36) in a lateral direction (dL) perpendicular to the second plane (P2); and a stopper portion (64) formed on the holder head (26), the stopper portion (64) having a stopper surface (66) facing a second direction different from the first direction faced by the upper clamping surface (38), wherein:

in cross-sections taken in fifth and sixth planes (P5, P6) parallel to the second plane (P2) and intersecting the spaced apart first and second lower clamping surfaces (34, 36), respectively, the first and second lower clamping surfaces (34, 36) are convex.

28. The insert holder (22) according to claim 27, further comprising:

a fastening member hole (70a) formed in an upper surface (26a) of the holder head (26);

a clamping portion hole (32a) formed in a forward facing surface (26b) of the holder head (26), the clamping portion hole (32a) intersecting the fastening member hole (70a), wherein:

the upper clamping portion (32) is received into the clamping portion hole (32a); and a fastening member (70) is received into the clamping member hole (70a) and engages the upper clamping portion (32).

29. The insert holder (22) according to claim 28, wherein:

the upper clamping portion (32) comprises a clamping head (72) and a clamping shaft (74) extending therefrom along a shaft axis (A5);

the upper clamping surface (38) is disposed on the clamping head (72); and the fastening member (70) engages a shaft recess (76) in the clamping shaft (74).

30. A cutting tool (20) comprising:

the insert holder (22) according to claim 27, and a single cutting insert (24) retained between the spaced apart lower and upper clamping portions (30, 32).

31. The cutting tool (20) according to claim 28, wherein:

the cutting insert (24) comprises opposing first and second end surfaces (40, 42) arranged along an insert axis (A3), a peripheral surface (44) extending between the first and second end surfaces (40, 42), and a plurality of cutting portions (48) circumferentially spaced apart about the peripheral surface (44), each cutting portion (48) having a cutting edge (50) extending along the insert axis (A3);

the upper clamping surface (38) abuts a first leading abutment surface (68a) formed on a first abutment portion (56') of the peripheral surface (44);

the stopper surface (66) abuts first trailing abutment surface (68b) formed on the first abutment portion (56') of the peripheral surface (44); and the spaced apart first and second lower clamping surfaces (34, 36) abut a second abutment portion (56") of the peripheral surface (44).

32. The insert holder (22) according to claim 27, wherein:

the pivot axis (A2) is perpendicular to the holder axis (A1); and the vertical second plane (P2) contains the holder axis (A1) and is perpendicular to the pivot axis (A2).

33. A cutting tool (20) comprising an insert holder (22) and an indexable cutting insert (24) removably secured therein, the insert holder (22) comprising:

a holder head (26) and a holder shank (28) extending rearwardly therefrom along a holder axis (A1), the holder head (26) having spaced apart lower and upper clamping portions (30, 32) located on opposite sides of a first plane (P1) containing the holder axis (A1), and further having a stopper portion (64), the lower clamping portion (30) extending along a pivot axis (A2) and having spaced apart first and second lower clamping surfaces (34, 36) located on opposite sides of a second plane (P2) perpendicular to the first plane (P1), the upper clamping portion (32) being displaceable relative to the lower clamping portion (30) and having an upper clamping surface (38) which is intersected by the second plane (P2), the stopper portion (64) being non-displaceable relative to the lower clamping portion (30) and having a stopper surface (66);

the cutting insert (24) comprising:

opposing first and second end surfaces (40, 42) with a peripheral surface (44) extending therebetween and an insert axis (A3) extending therethrough, the peripheral surface (44) having a plurality of cutting portions (48) circumferentially spaced apart about the insert axis (A3), one of the plurality of cutting portions (48) being an operative first cutting portion (48') having an operative first cutting edge (50') formed at the intersection of a first rake surface (52') and a first relief surface (54'), the first rake surface (52') facing in a first direction (d1) about the insert axis (A3), wherein:

the upper clamping surface (38) makes contact with a first leading abutment surface (68a) which is formed on a first abutment portion (56') of the peripheral surface (44), the first leading abutment surface (68a) facing in said first direction (d1) about the insert axis (A3), the stopper surface (66) makes contact with a first trailing abutment surface (68b) which also is formed on the first abutment portion (56') of the peripheral surface (44), the first trailing abutment surface (68b) facing in a second direction (d2) about the insert axis (A3) rotationally opposite to said first direction (d1), a second abutment portion (56") of the peripheral surface (44) makes contact with the first and second lower clamping surfaces (34, 36), the second plane (P2) intersects the plurality of cutting portions (48), each cutting portion (48) has a cutting edge (50), in a cross-section taken in a fourth plane (P4) coincident with or parallel to the second plane (P2), the plurality of cutting edges (50) define a first imaginary circle (C1) which circumscribes the peripheral surface (44), the cutting insert (24) has a maximum width ($W_{MAX}$) in a direction parallel to the insert axis (A3), and the maximum width ($W_{MAX}$) is greater than a first radius (R1) of the first imaginary circle (C1).

34. The cutting tool (20) according to claim 33, wherein:

the first and second lower clamping surfaces (34, 36) are spaced apart from one another along the pivot axis (A2) by a transitional surface (35) which is recessed relative to the first and second lower clamping surfaces (34, 36).

* * * * *